(12) United States Patent
Kim et al.

(10) Patent No.: US 11,125,973 B2
(45) Date of Patent: Sep. 21, 2021

(54) OPTICAL IMAGING SYSTEM COMPRISING FOUR LENSES OF ++++ REFRACTIVE POWERS

(71) Applicant: SAMSUNG ELECTRO-MECHANICS CO., LTD., Suwon-si (KR)

(72) Inventors: Hag Chul Kim, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 149 days.

(21) Appl. No.: 16/506,063

(22) Filed: Jul. 9, 2019

(65) Prior Publication Data

US 2020/0158991 A1 May 21, 2020

(30) Foreign Application Priority Data

Nov. 19, 2018 (KR) .......................... 10-2018-0142402

(51) Int. Cl.
*G02B 9/34* (2006.01)
*G02B 13/00* (2006.01)

(52) U.S. Cl.
CPC ............. *G02B 9/34* (2013.01); *G02B 13/004* (2013.01)

(58) Field of Classification Search
CPC ................................ G02B 9/34; G02B 13/004
See application file for complete search history.

(56) References Cited

U.S. PATENT DOCUMENTS

| 6,900,948 | B2 | 5/2005 | Sato |
| 8,358,475 | B2 | 1/2013 | Tsai et al. |
| 9,645,355 | B2 | 5/2017 | Son |
| 10,353,175 | B1 | 7/2019 | Huang et al. |
| 2014/0146401 | A1 | 5/2014 | Tsai et al. |
| 2017/0293108 | A1 | 10/2017 | Liao et al. |
| 2018/0011297 | A1 | 1/2018 | Lai et al. |
| 2019/0204541 | A1* | 7/2019 | Huang ................. G02B 13/004 |

FOREIGN PATENT DOCUMENTS

| CN | 103852865 A | 6/2014 |
| CN | 107315236 A | 11/2017 |
| CN | 108152923 A | 6/2018 |
| EP | 2 264 504 A1 | 12/2010 |
| KR | 10-1467854 B1 | 12/2014 |
| KR | 10-2017-0066005 A | 6/2017 |

OTHER PUBLICATIONS

Taiwanese Office Action dated Jul. 2, 2020 in corresponding Taiwanese Patent Application No. 108124657 (7 pages in English, 6 pages in Chinese).
Office Action dated Apr. 1, 2021 issued in counterpart Chinese Patent Application No. 201910957315.8. (7 pages in English)(7 pages in Chinese).
Indian Examination Report dated Apr. 14, 2021 issued in couterpart Indian Patent Application No. 201914031076 (6 pages in English).

* cited by examiner

*Primary Examiner* — Wen Huang
(74) *Attorney, Agent, or Firm* — NSIP Law

(57) ABSTRACT

An optical imaging system includes a first lens having positive refractive power, a second lens having positive refractive power, a third lens having positive refractive power, and a fourth lens having positive refractive power, and an F No. of the optical imaging system is equal to or less than 1.0. The optical imaging system is capable of achieving miniaturization while capturing an image at low illumination.

16 Claims, 10 Drawing Sheets

# OPTICAL IMAGING SYSTEM COMPRISING FOUR LENSES OF ++++ REFRACTIVE POWERS

CROSS-REFERENCE TO RELATED APPLICATION

This application claims the benefit under 35 USC 119(a) of Korean Patent Application No. 10-2018-0142402 filed on Nov. 19, 2018 in the Korean Intellectual Property Office, the entire disclosure of which is incorporated herein by reference for all purposes.

BACKGROUND

1. Field

The following description relates to an optical imaging system capable of implementing a bright image.

2. Description of Background

An optical system for a camera, mounted in a small terminal, has a short total length, and thus, it may be difficult to implement a low F number. In this regard, a camera for a small terminal may not be able to obtain a high-resolution image pickup of an object and image an object in a low-illuminance environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An optical imaging system capable of imaging a subject in a low-illuminance environment while being mounted on a small terminal.

In one general aspect, an optical imaging system includes a first lens having positive refractive power, a second lens having positive refractive power, a third lens having positive refractive power, and a fourth lens having positive refractive power, and an F No. of the optical imaging system is equal to or less than 1.0.

Visible light transmission of the first lens may be equal to or less than 5%.

The second lens may include an inflection point on an image-side surface.

The third lens may include a convex image-side surface.

The fourth lens may include a concave image-side surface.

The optical imaging system may satisfy $5.0<(f1+f2)/f<80$, where f is a focal length of the optical imaging system, f1 is a focal length of the first lens, and f2 is a focal length of the second lens.

The optical imaging system may satisfy $1.0<f3/f<2.5$, where f is a focal length of the optical imaging system, and f3 is a focal length of the third lens.

The optical imaging system may satisfy $1.0<f4/f<6.0$, where f is a focal length of the optical imaging system, and f4 is a focal length of the fourth lens.

The optical imaging system may satisfy $0.3<R1/f<2.0$, where f is a focal length of the optical imaging system, and R1 is a radius of curvature of an object-side surface of the first lens.

The optical imaging system may satisfy $0.3<R3/f<2.0$, where f is a focal length of the optical imaging system, and R3 is a radius of curvature of an object-side surface of the second lens.

The optical imaging system may satisfy $5.0<R5/f<80$, where f is a focal length of the optical imaging system, and R5 is a radius of curvature of an object-side surface of the third lens.

The optical imaging system may satisfy $1.580<Nd1<1.640$, where Nd1 is a refractive index of the first lens.

In another general aspect, an optical imaging system includes lenses sequentially disposed from an object side to an image surface of the optical imaging system, and each of the lenses has refractive power. A lens closest to the object side, among the lenses, has positive refractive power, and an F No. of the optical imaging system is equal to or less than 1.0.

The optical imaging system may satisfy $1.0<TTL/f<2.0$, where TTL is a distance from an object-side surface of the lens closest to the object side to the image surface, and f is a focal length of the optical imaging system.

The optical imaging system may satisfy $0.3<R1/TTL<5.0$, where TTL is a distance from an object-side surface of the lens closest to the object side to the image surface, and R1 is a focal length of the lens closest to the object side.

The optical imaging system may satisfy $0.5<EPD/TTL<0.7$, where TTL is a distance from an object-side surface of the lens closest to the object side to the image surface, and EPD is a diameter of an entrance pupil.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
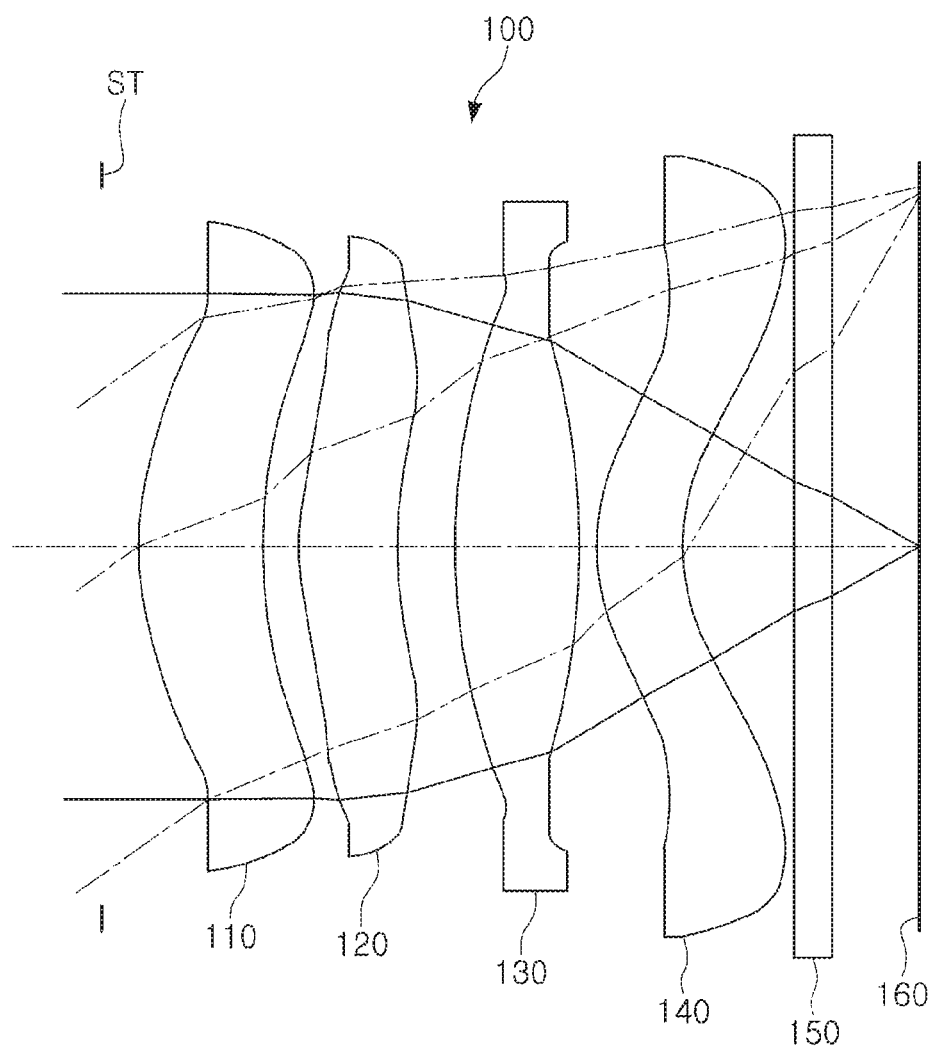
FIG. 1 is a view illustrating an optical imaging system according to a first example.

The following detailed description is provided to assist the reader in gaining a comprehensive understanding of the methods, apparatuses, and/or systems described herein.

However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

A thickness, a size, and a shape of a lens illustrated in the drawings may be exaggeratedly illustrated for illustrative purposes. In addition, a shape of a spherical or aspherical surface of a lens described and illustrated in the detailed description or drawings is only an example, and is not limited to the shape of the lens.

In this specification, all numerical values of radii of curvature and thicknesses, distances, focal lengths, of lenses, and the like, are indicated by millimeters (mm), and angles are indicated by degrees.

In this specification, the description of a shape of a lens refers to a shape of a paraxial region of the lens. For example, the meaning that an object-side surface of a first lens is convex is that a paraxial region of the object-side surface of the first lens is convex. Thus, even when it is described that an object-side surface of a lens is convex, the entirety of an object-side surface of a lens may not be convex. For example, even when it is described that an image-side surface of a first lens is concave, an edge of an image-side surface of the first lens may be convex. For reference, the paraxial region described above refers to a region including an optical axis.

An optical imaging system according to an example may include a plurality of lenses disposed along an optical axis. For example, the optical imaging system includes a first lens, a second lens, a third lens, and a fourth lens, sequentially disposed from the optical axis. Here, a first lens refers to a lens closest to the object (or the subject), while the fourth lens refers to a lens closest to an image surface or an image sensor.

Next, a configuration of an optical imaging system will be described.

The optical imaging system includes a plurality of lenses. The optical imaging system includes a first lens, a second lens, a third lens, and a fourth lens, sequentially disposed from the object side as described above.

The optical imaging system may further include an image sensor and a filter. The image sensor forms an image surface, and converts light, reflected by the first lens to the fourth lens, into an electrical signal. The filter is disposed between a lens and an image surface, and blocks intrusion of foreign matter. The filter may be an infrared ray pass filter which passes infrared rays. Moreover, the filter may be configured to significantly reduce transmission of visible light.

The optical imaging system may further include a stop and a spacer. The stop is disposed in front of the first lens or between a lens and an adjacent lens to adjust an amount of light incident on an image surface. A spacer is disposed between a lens and a lens to allow a distance between the lenses to be constant. Moreover, the spacer is made of a light shielding material and may block unnecessary light penetrating into a rib side of the lens.

Next, a lens forming an optical imaging system will be described.

A first lens has refractive power. For example, the first lens may have positive refractive power. One surface of the first lens is convex. For example, an object-side surface of the first lens may be convex. The first lens includes an aspherical surface. For example, both surfaces of the first lens may be aspherical surfaces. The first lens is configured to reduce the transmission of visible light. For example, the visible light transmission of the first lens may be equal to or less than 5%. The first lens may be manufactured to have a substantially dark color. For example, the first lens may be manufactured using a black-based raw material, thereby reducing visible light transmission and increasing infrared ray transmission. The first lens has a relatively high refractive index. For example, the refractive index of the first lens may be greater than the refractive index of each of the second lens to the fourth lens.

A second lens has refractive power. For example, the second lens may have positive refractive power. One surface of the second lens is convex. For example, an object-side surface of the second lens may be convex. The second lens may have an aspherical surface. For example, both surfaces of the second lens may be aspherical surfaces.

A third lens has refractive power. For example, the third lens may have positive refractive power. At least one surface of a third lens is convex. For example, an object-side surface or an image-side surface of the third lens may be convex or both surfaces of the third lens may be convex. The third lens includes an aspherical surface. For example, both surfaces of the third lens may be aspherical surfaces.

A fourth lens has refractive power. For example, the fourth lens may have positive refractive power. One surface of the fourth lens is concave. For example, an image-side surface of the fourth lens may be concave. The fourth lens has a shape having an inflection point. For example, an inflection point may be formed in at least one surface of an object-side surface and an image-side surface of the fourth lens. Thus, in at least one surface of the fourth lens, a shape of a paraxial region may be different from a shape of a peripheral portion. For example, in the fourth lens, a paraxial region is concave and an edge portion of the paraxial region may be convex. A fourth lens includes an aspherical surface. For example, both surfaces of the fourth lens may be aspherical surfaces.

An aspherical surface of the first lens to the fourth lens may be expressed by the following Equation 1:

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + \ldots \quad \text{Equation 1}$$

In Equation 1, c is an inverse of a radius of curvature of a lens, K is a conic constant, Y is a distance from a certain point on an aspherical surface of the lens to an optical axis in a direction perpendicular to the optical axis, and A to H are aspherical constants. Moreover, Z (or SAG) is a distance between the certain point on the aspherical surface of the lens at the distance Y and a tangential plane meeting the apex of the aspherical surface of the lens in the optical axis direction.

The optical imaging system may satisfy one or more of the following Conditional Expressions:

| | |
|---|---|
| $1.0 < TTL/f < 2.0$ | Conditional Expression 1 |
| $0.3 < R1/TTL < 5.0$ | Conditional Expression 2 |
| $0.5 < EPD/TTL < 0.7$ | Conditional Expression 3 |
| $5.0 < (f1+f2)/f < 80$ | Conditional Expression 4 |
| $1.0 < f3/f < 2.5$ | Conditional Expression 5 |
| $1.0 < f4/f < 6.0$ | Conditional Expression 6 |
| $0.3 < R1/f < 2.0$ | Conditional Expression 7 |
| $0.3 < R3/f < 2.0$ | Conditional Expression 8 |
| $5.0 < R5/f < 80$ | Conditional Expression 9 |
| $0.8 < F\ No < 1.5$ | Conditional Expression 10 |
| $1.580 < Nd1 < 1.640.$ | Conditional Expression 11 |

In the Conditional Expressions, TTL is a distance from an object-side surface to an image surface of a first lens, f is a focal length of the optical imaging system, f1 is a focal length of the first lens, f2 is a focal length of a second lens, f3 is a focal length of a third lens, f4 is a focal length of a fourth lens, R1 is a radius of curvature of the object-side surface of the first lens, R3 is a radius of curvature of an object-side surface of the second lens, R5 is a radius of curvature of an object-side surface of the third lens, EPD is a diameter of entrance pupil, and Nd1 is a refractive index of the first lens.

Next, various examples of an optical imaging system will be described.

Figure 2:
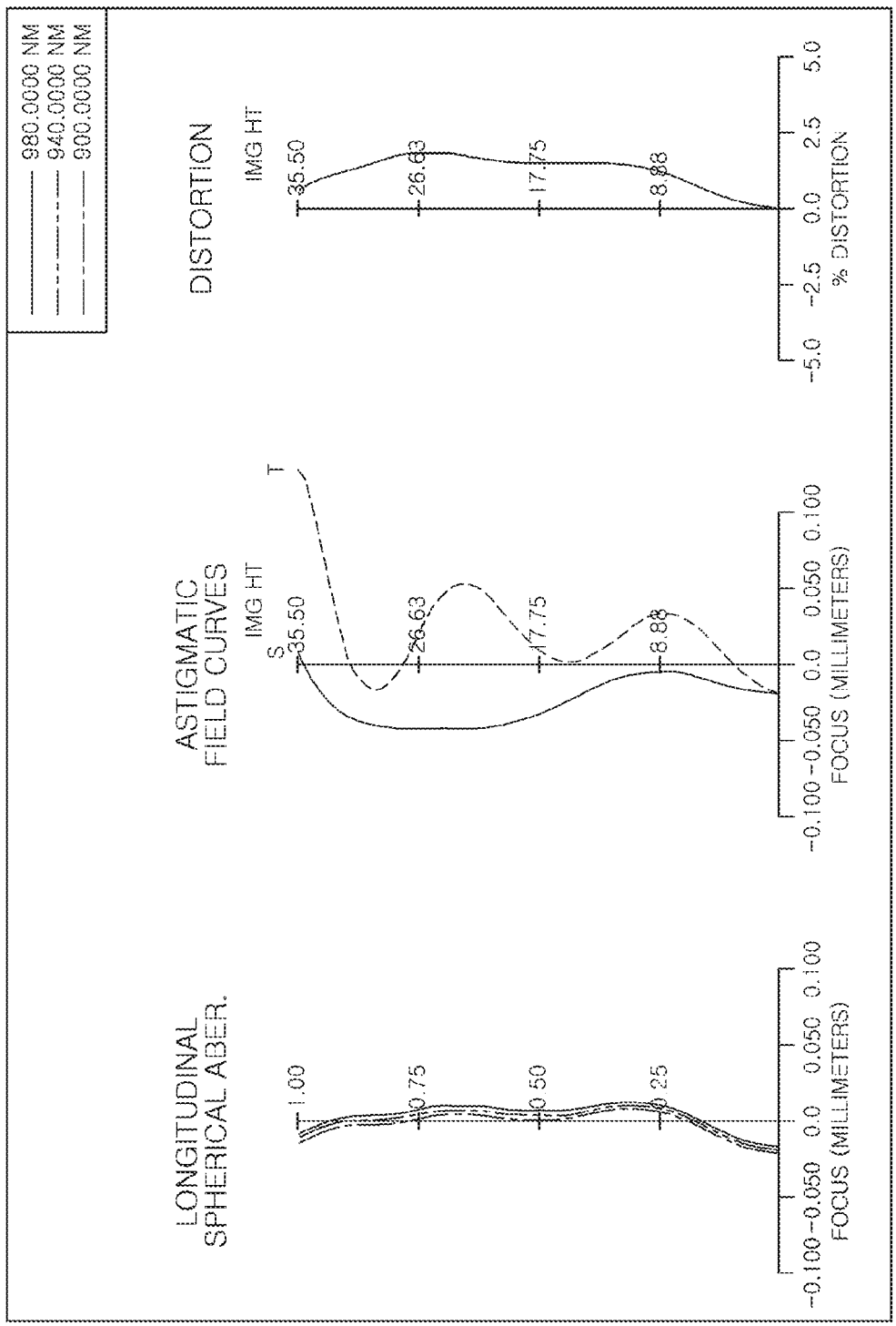
FIG. 2 is an aberration curve of the optical imaging system illustrated in FIG. 1.

FIG. 1 is a view illustrating an optical imaging system according to embodiment first example, and FIG. 2 is an aberration curve of the optical imaging system of FIG. 1.

An optical imaging system 100 includes a first lens 110, a second lens 120, a third lens 130, and a fourth lens 140.

The first lens 110 has positive refractive power, and an object-side surface is convex and an image-side surface is concave. The second lens 120 has positive refractive power, and an object-side surface is convex and an image-side surface is concave. The third lens 130 has positive refractive power, and an object-side surface is convex and an image-side surface is convex. The fourth lens 140 has positive refractive power, and an object-side surface is convex and an image-side surface is concave. Moreover, an inflection point is formed on an object-side surface and an image-side surface of the fourth lens 140.

The optical imaging system 100 further includes a stop ST, a filter 150, and an image sensor 160. The stop ST is disposed in front of the first lens 110, and adjusts an amount of light incident on the image sensor 160. The filter 150 is disposed between the fourth lens 140 and the image sensor 160. The image sensor 160 forms an image surface on which an image of a subject could be focused.

Table 1 illustrates physical properties of the lenses constituting the optical imaging system 100, and Table 2 illustrates aspherical coefficients of the lenses constituting the optical imaging system 100.

TABLE 1

| Surface No. | Remark | Radius of Curvature | Thickness or Distance | Refractive Index | Abbe Number | Focal Length |
|---|---|---|---|---|---|---|
| S1 | First Lens | 2.2190 | 0.7200 | 1.6174 | 23.52 | 129.211 |
| S2 | | 2.0000 | 0.2280 | | | |
| S3 | Second Lens | 1.7390 | 0.5900 | 1.5354 | 56.09 | 7.55 |
| S4 | | 2.6910 | 0.3940 | | | |
| S5 | Third Lens | 84.0000 | 0.6900 | 1.5354 | 56.09 | 4.859 |
| S6 | | −2.6770 | 0.1000 | | | |
| S7 | Fourth Lens | 1.2200 | 0.5130 | 1.5354 | 56.09 | 13.848 |
| S8 | | 1.2460 | 0.6650 | | | |
| S9 | Filter | infinity | 0.2210 | 1.5084 | 64.17 | |
| S10 | | infinity | 0.5110 | | | |
| S11 | Imaging Plane | infinity | 0.0200 | | | |

TABLE 2

| Surface No. | S1 | S2 | S3 | S4 | S5 | S6 | S7 | S8 |
|---|---|---|---|---|---|---|---|---|
| K | −0.49620 | −2.61900 | −6.34400 | −0.55080 | 92.09000 | −21.43000 | −0.97370 | −1.58900 |
| A | −0.02765 | −0.07870 | 0.00103 | 0.02536 | 0.21940 | −0.01058 | −0.04776 | 0.06506 |
| B | 0.04327 | 0.02187 | −0.15510 | −0.18990 | −0.23180 | −0.06557 | −0.04548 | −0.13280 |
| C | −0.06624 | 0.02268 | 0.13480 | 0.10690 | 0.16770 | 0.18840 | 0.00893 | 0.06991 |
| D | 0.05756 | −0.01586 | −0.05344 | −0.00916 | −0.08951 | −0.20260 | 0.00183 | −0.02038 |
| E | −0.02737 | 0.00248 | 0.01445 | −0.01380 | 0.02954 | 0.10950 | −0.00045 | 0.00356 |
| F | 0.00629 | 0.00018 | −0.00278 | 0.00597 | −0.00407 | −0.02890 | −1.7E−06 | −0.00034 |
| G | −0.00059 | −0.00007 | 0.00025 | −0.00078 | −0.00003 | 0.00294 | −1.7E−14 | 0.00001 |
| H | 0 | 0 | 0 | 0 | 0 | 0 | 0 | 0 |

Figure 3:
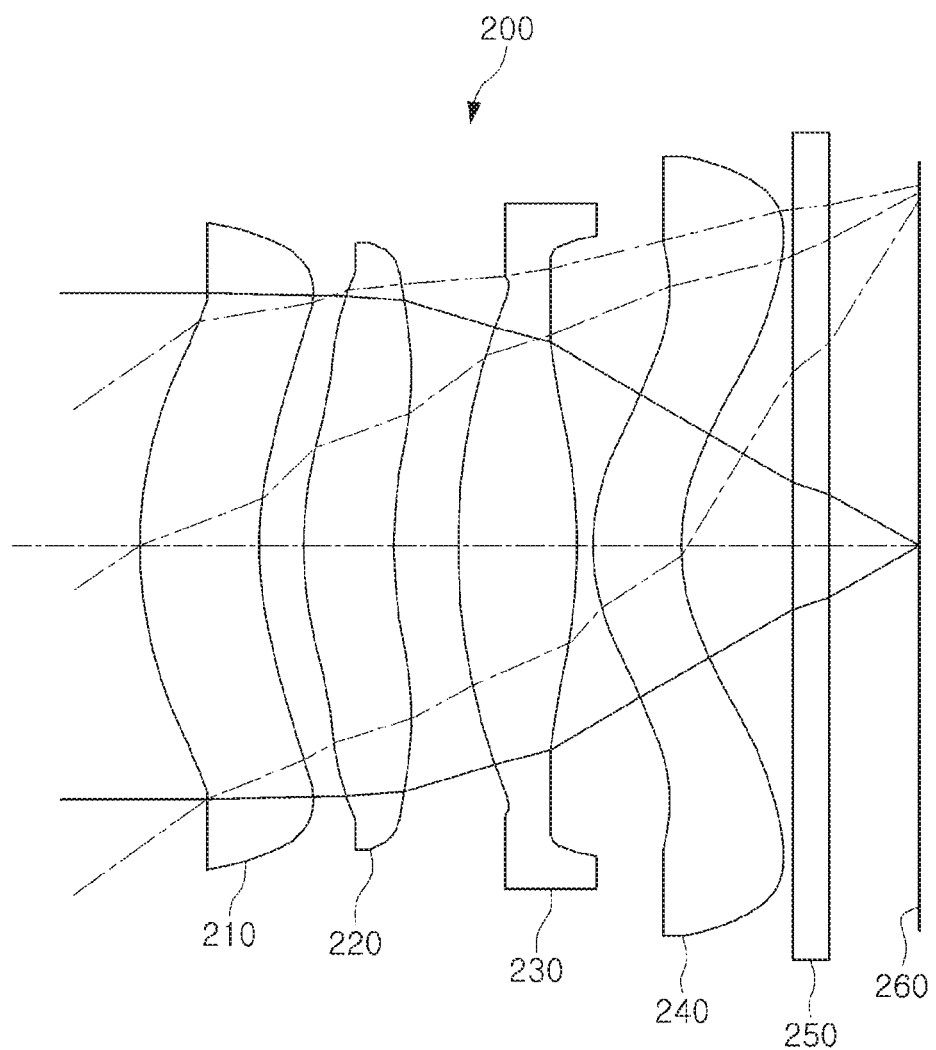
FIG. 3 is a view illustrating an optical imaging system according to a second example.
Figure 4:
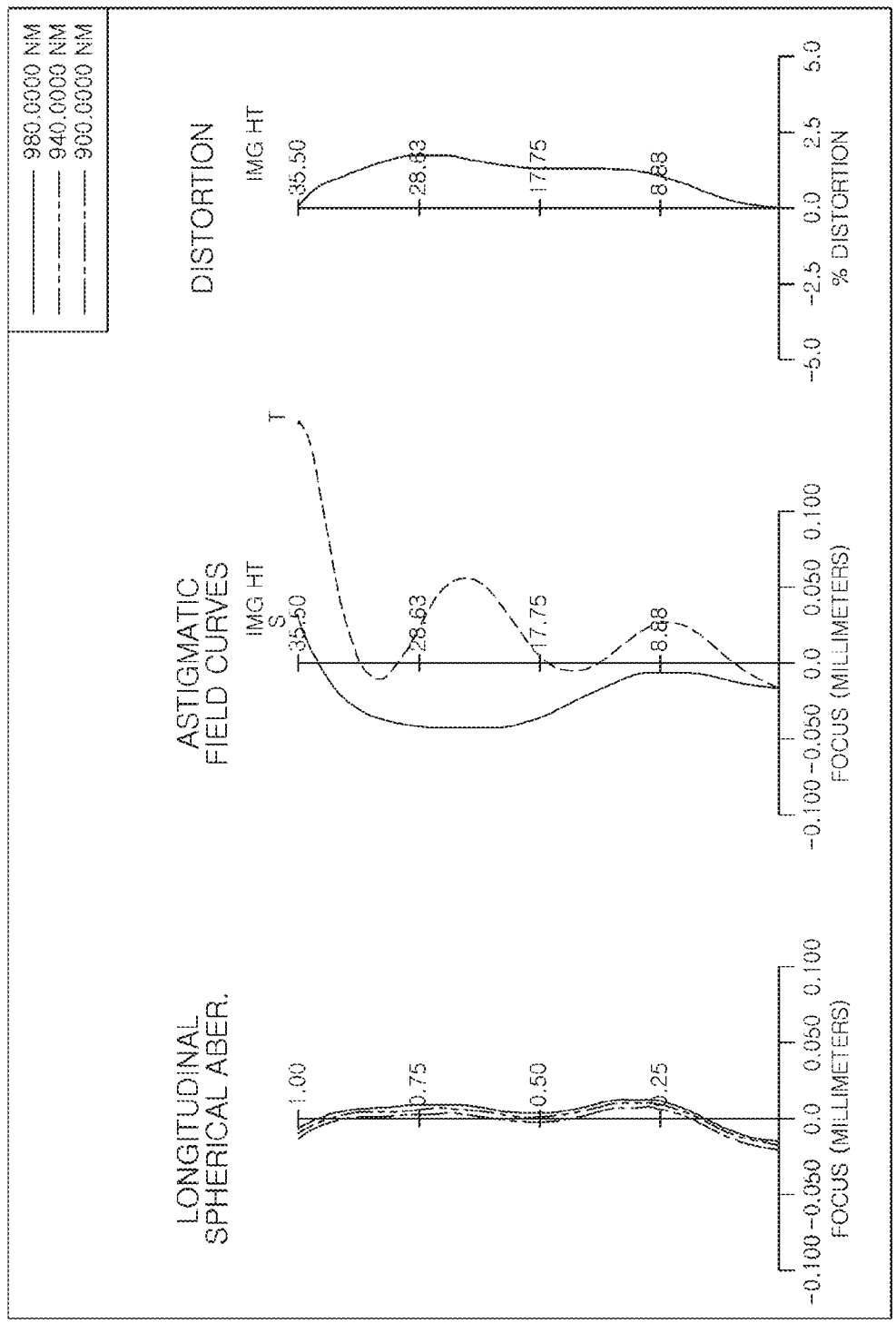
FIG. 4 is an aberration curve of the optical imaging system illustrated in FIG. 3.

FIG. 3 is a view illustrating an optical imaging system according to embodiment second example, and FIG. 4 is an aberration curve of the optical imaging system of FIG. 3.

An optical imaging system 200 includes a first lens 210, a second lens 220, a third lens 230, and a fourth lens 240.

The first lens 210 has positive refractive power, and an object-side surface is convex and an image-side surface is concave. The second lens 220 has positive refractive power, and an object-side surface is convex and an image-side surface is concave. The third lens 230 has positive refractive power, and an object-side surface is convex and an image-side surface is convex. The fourth lens 240 has positive refractive power, and an object-side surface is convex and an image-side surface is concave. Moreover, an inflection point is formed on an object-side surface and an image-side surface of the fourth lens 240.

The optical imaging system 200 further includes a stop ST, a filter 250, and an image sensor 260. The stop ST is disposed in front of the first lens 210, and adjusts an amount of light incident on the image sensor 260. The filter 250 is disposed between the fourth lens 240 and the image sensor 260. The image sensor 260 forms an image surface on which an image of a subject could be focused.

Table 3 illustrates physical properties of the lenses constituting the optical imaging system 200, and Table 4 illustrates aspherical coefficients of the lenses constituting the optical imaging system 200.

TABLE 3

| Surface No. | Remark | Radius of Curvature | Thickness or Distance | Refractive Index | Abbe Number | Focal Length |
|---|---|---|---|---|---|---|
| S1 | First Lens | 2.2050 | 0.7200 | 1.6174 | 23.52 | 101.544 |
| S2 | | 2.0000 | 0.2540 | | | |
| S3 | Second Lens | 1.6740 | 0.5490 | 1.5354 | 56.09 | 7.565 |
| S4 | | 2.5270 | 0.4280 | | | |
| S5 | Third Lens | 84.0000 | 0.6580 | 1.5354 | 56.09 | 5.065 |
| S6 | | −2.7950 | 0.1000 | | | |
| S7 | Fourth Lens | 1.2200 | 0.5170 | 1.5354 | 56.09 | 13.618 |
| S8 | | 1.2490 | 0.6750 | | | |
| S9 | Filter | infinity | 0.2210 | 1.5084 | 64.17 | |
| S10 | | infinity | 0.5120 | | | |
| S11 | Imaging Plane | infinity | 0.0200 | | | |

TABLE 4

| Surface No. | S1 | S2 | S3 | S4 | S5 | S6 | S7 | S8 |
|---|---|---|---|---|---|---|---|---|
| K | −0.59080 | −2.61300 | −5.69200 | −1.12900 | 92.09000 | −22.67000 | −0.98480 | −0.85660 |
| A | −0.02889 | −0.07813 | 0.00374 | 0.02072 | 0.22100 | −0.00272 | −0.04975 | 0.01756 |

TABLE 4-continued

| Surface No. | S1 | S2 | S3 | S4 | S5 | S6 | S7 | S8 |
|---|---|---|---|---|---|---|---|---|
| B | 0.04367 | 0.02221 | −0.15600 | −0.18920 | −0.22970 | −0.06494 | −0.04395 | −0.12620 |
| C | −0.06635 | 0.02286 | 0.13480 | 0.10720 | 0.16710 | 0.18750 | 0.00880 | 0.06884 |
| D | 0.05756 | −0.01587 | −0.05344 | −0.00916 | −0.09016 | −0.20300 | 0.00184 | −0.02031 |
| E | −0.02734 | 0.00244 | 0.01445 | −0.01380 | 0.02971 | 0.10960 | −0.00045 | 0.00356 |
| F | 0.00630 | 0.00017 | −0.00278 | 0.00597 | −0.00407 | −0.02890 | −1.7E−06 | −0.00034 |
| G | −0.00059 | −0.00006 | 0.00025 | −0.00078 | −0.00003 | 0.00294 | −1.7E−14 | 0.00001 |
| H | 0 | 0 | 0 | 0 | 0 | 0 | 0 | 0 |

Figure 5:
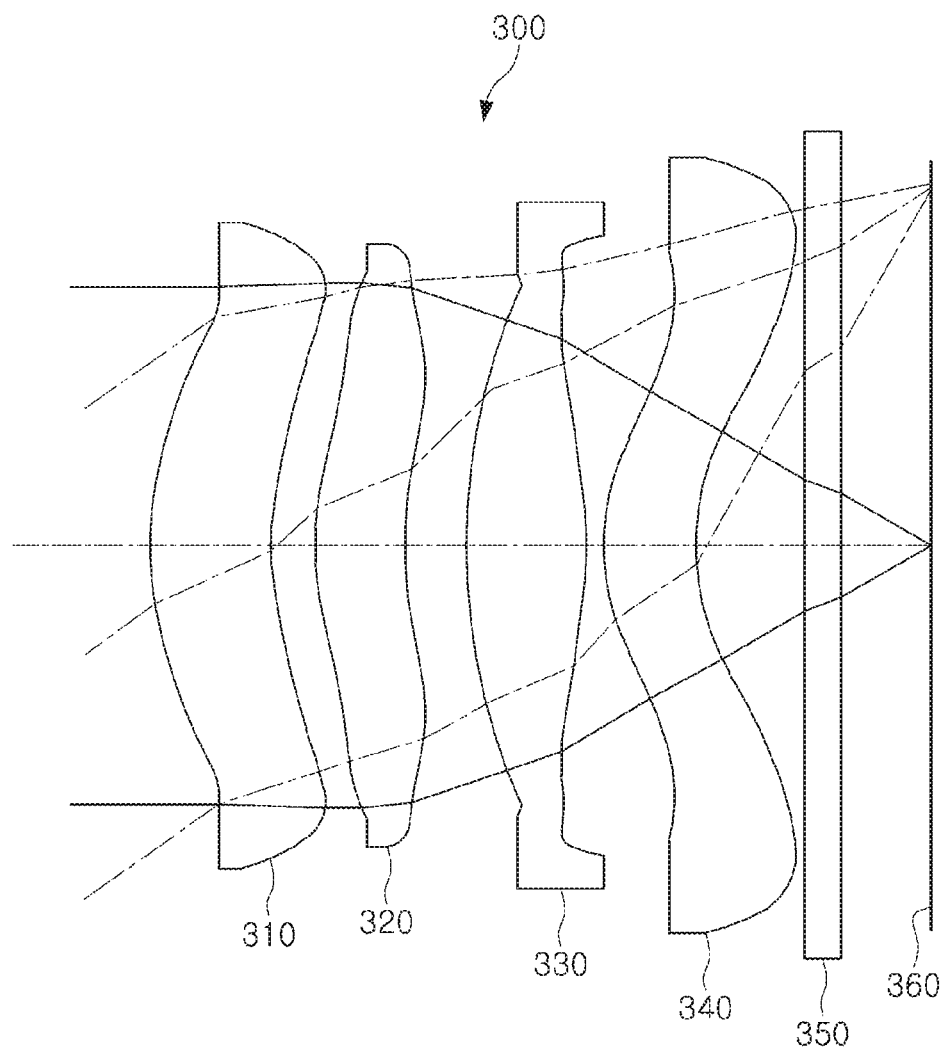
FIG. 5 is a view illustrating an optical imaging system according to a third example.
Figure 6:
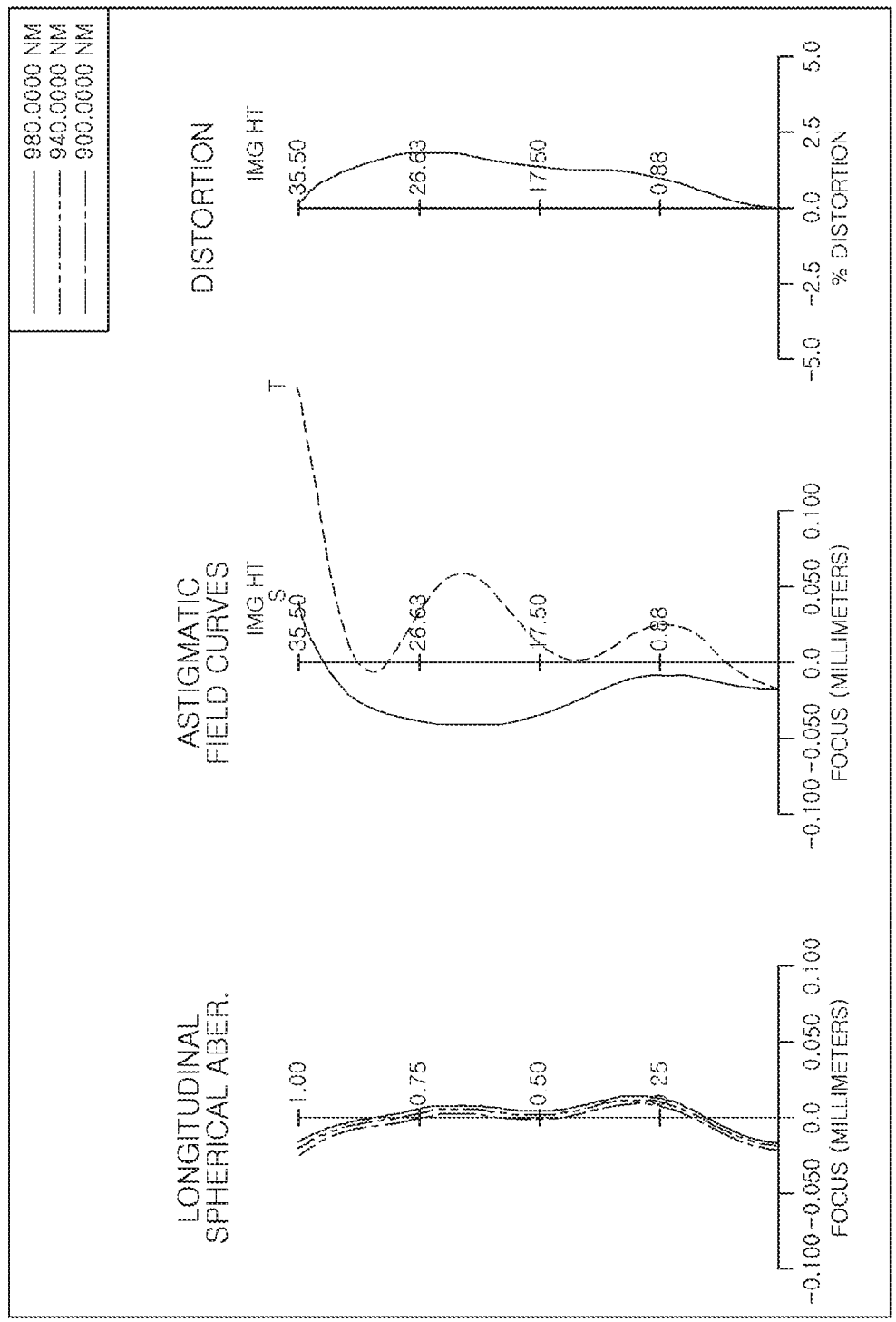
FIG. 6 is an aberration curve of the optical imaging system illustrated in FIG. 5.

FIG. 5 is a view illustrating an optical imaging system according to embodiment third example, and FIG. 6 is an aberration curve of the optical imaging system of FIG. 5.

An optical imaging system 300 includes a first lens 310, a second lens 320, a third lens 330, and a fourth lens 340.

The first lens 310 has positive refractive power, and an object-side surface is convex and an image-side surface is concave. The second lens 320 has positive refractive power, and an object-side surface is convex and an image-side surface is concave. The third lens 330 has positive refractive power, and an object-side surface is convex and an image-side surface is convex. The fourth lens 340 has positive refractive power, and an object-side surface is convex and an image-side surface is concave. Moreover, an inflection point is formed on an object-side surface and an image-side surface of the fourth lens 340.

The optical imaging system 300 further includes a stop ST, a filter 350, and an image sensor 360. The stop ST is disposed in front of the first lens 310, and adjusts an amount of light incident on the image sensor 360. The filter 350 is disposed between the fourth lens 340 and the image sensor 360. The image sensor 360 forms an image surface on which an image of a subject could be focused.

Table 5 illustrates physical properties of the lenses constituting the optical imaging system 300, and Table 6 illustrates aspherical coefficients of the lenses constituting the optical imaging system 300.

TABLE 5

| Surface No. | Remark | Radius of Curvature | Thickness or Distance | Refractive Index | Abbe Number | Focal Length |
|---|---|---|---|---|---|---|
| S1 | First Lens | 2.1960 | 0.7200 | 1.6174 | 23.52 | 90.74 |
| S2 | | 2.0000 | 0.2550 | | | |
| S3 | Second Lens | 1.6530 | 0.5420 | 1.5354 | 56.09 | 7.545 |
| S4 | | 2.4790 | 0.4360 | | | |
| S5 | Third Lens | 84.0000 | 0.6460 | 1.5354 | 56.09 | 5.382 |
| S6 | | −2.9760 | 0.1000 | | | |
| S7 | Fourth Lens | 1.2200 | 0.5390 | 1.5354 | 56.09 | 12.242 |
| S8 | | 1.2680 | 0.6620 | | | |
| S9 | Filter | infinity | 0.2210 | 1.5084 | 64.17 | |
| S10 | | infinity | 0.5110 | | | |
| S11 | Imaging Plane | infinity | 0.0200 | | | |

TABLE 6

| Surface No. | S1 | S2 | S3 | S4 | S5 | S6 | S7 | S8 |
|---|---|---|---|---|---|---|---|---|
| K | −0.57380 | −2.23000 | −5.72900 | −1.24500 | 92.09000 | −24.96000 | −1.15900 | −0.99650 |
| A | −0.02770 | −0.08218 | 0.00755 | 0.01810 | 0.21660 | −0.01075 | −0.05739 | 0.01652 |
| B | 0.04300 | 0.02123 | −0.16050 | −0.18820 | −0.22830 | −0.06222 | −0.03244 | −0.11680 |
| C | −0.06655 | 0.02339 | 0.13580 | 0.10710 | 0.16800 | 0.18960 | 0.00672 | 0.06639 |
| D | 0.05758 | −0.01584 | −0.05344 | −0.00916 | −0.09043 | −0.20390 | 0.00184 | −0.02008 |
| E | −0.02724 | 0.00238 | 0.01445 | −0.01380 | 0.02967 | 0.10970 | −0.00045 | 0.00356 |
| F | 0.00632 | 0.00015 | −0.00278 | 0.00597 | −0.00407 | −0.02890 | −1.7E−06 | −0.00034 |
| G | −0.00061 | −0.00005 | 0.00025 | −0.00078 | −0.00003 | 0.00294 | −1.7E−14 | 0.00001 |
| H | 0 | 0 | 0 | 0 | 0 | 0 | 0 | 0 |

Figure 7:
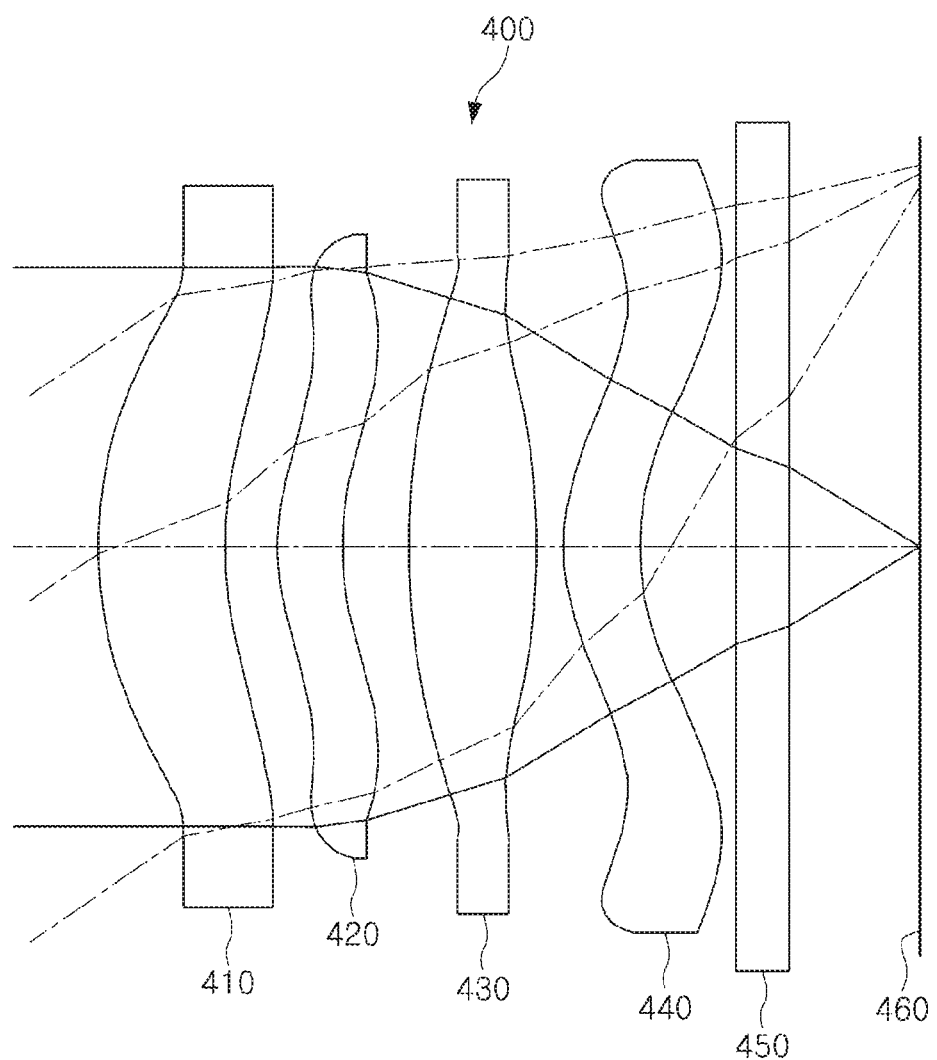
FIG. 7 is a view illustrating an optical imaging system according to a fourth example.
Figure 8:
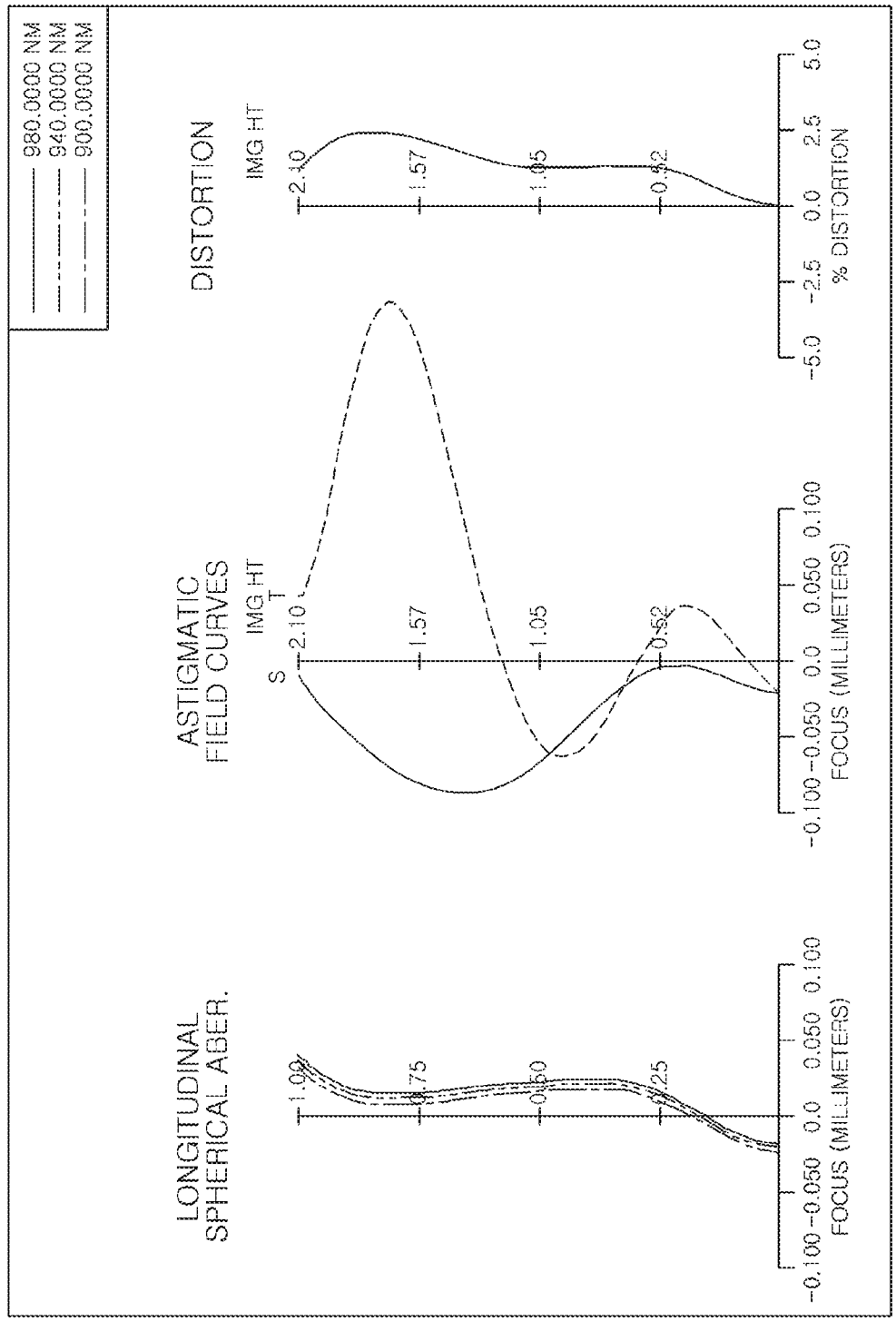
FIG. 8 is an aberration curve of the optical imaging system illustrated in FIG. 7.

FIG. 7 is a view illustrating an optical imaging system according to embodiment fourth example, and FIG. 8 is an aberration curve of the optical imaging system of FIG. 7.

An optical imaging system 400 includes a first lens 410, a second lens 420, a third lens 430, and a fourth lens 440.

The first lens 410 has positive refractive power, and an object-side surface is convex and an image-side surface is concave. The second lens 420 has positive refractive power, and an object-side surface is convex and an image-side surface is concave. The third lens 430 has positive refractive power, and an object-side surface is convex and an image-side surface is convex. The fourth lens 440 has positive refractive power, and an object-side surface is convex and an image-side surface is concave. In addition, an inflection point is formed on an object-side surface and an image-side surface of the fourth lens 440.

The optical imaging system 400 further includes a stop ST, a filter 450, and an image sensor 460. The stop ST is disposed in front of the first lens 410, and adjusts an amount of light incident on the image sensor 460. The filter 450 is disposed between the fourth lens 440 and the image sensor 460. The image sensor 460 forms an image surface on which an image of a subject could be focused.

Table 7 illustrates physical properties of the lenses constituting the optical imaging system 400, and Table 8 illustrates aspherical coefficients of the lenses constituting the optical imaging system 400.

Figure 9:
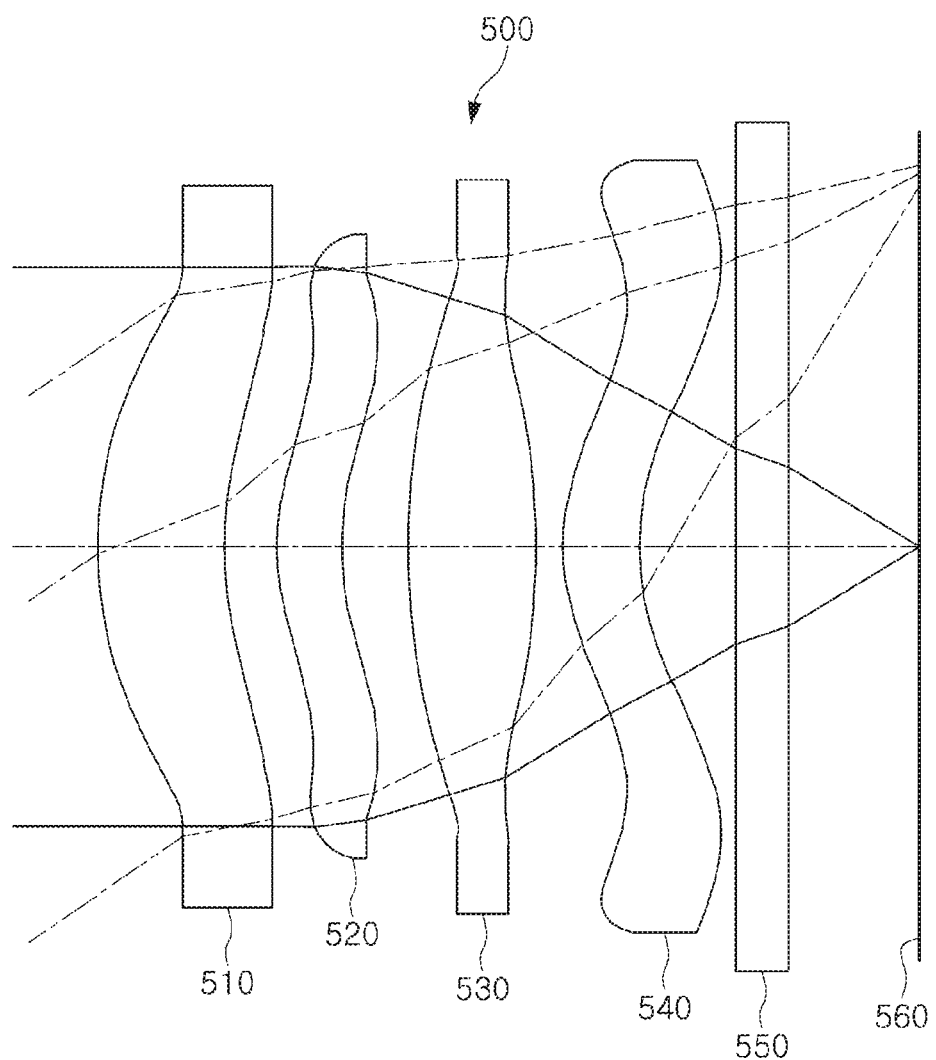
FIG. 9 is a view illustrating an optical imaging system according to a fifth example.
Figure 10:
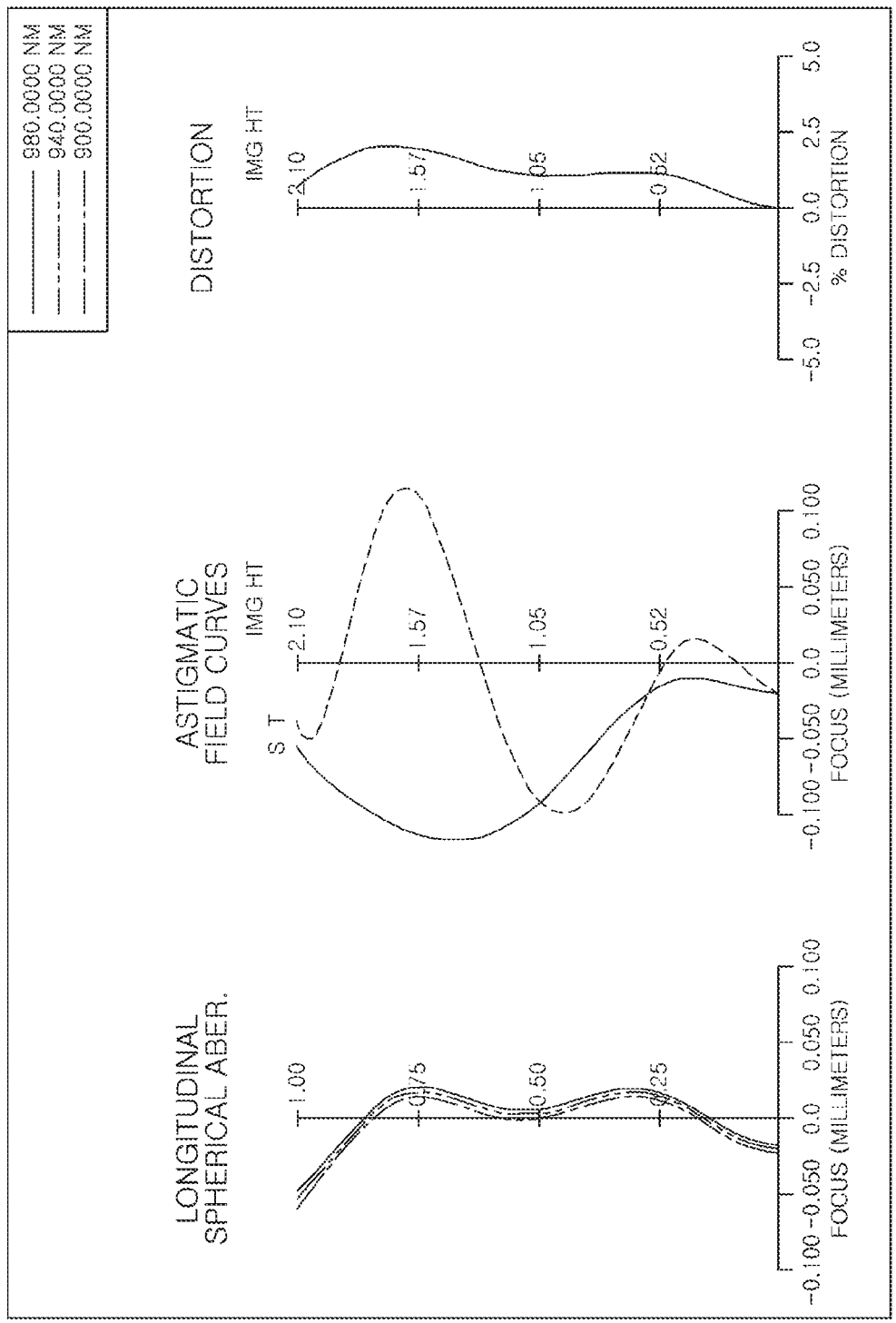
FIG. 10 is an aberration curve of the optical imaging system illustrated in FIG. 9.

FIG. 9 is a view illustrating an optical imaging system according to embodiment fifth example, and FIG. 10 is an aberration curve of the optical imaging system of FIG. 9.

An optical imaging system 500 includes a first lens 510, a second lens 520, a third lens 530, and a fourth lens 540.

The first lens 510 has positive refractive power, and an object-side surface is convex and an image-side surface is concave. The second lens 520 has positive refractive power, and an object-side surface is convex and an image-side surface is concave. The third lens 530 has positive refractive power, and an object-side surface is convex and an image-side surface is convex. The fourth lens 540 has positive refractive power, and an object-side surface is convex and an image-side surface is concave. In addition, an inflection point is formed on an object-side surface and an image-side surface of the fourth lens 540.

The optical imaging system 500 further includes a stop ST, a filter 550, and an image sensor 560. The stop ST is disposed in front of the first lens 510, and adjusts an amount of light incident on the image sensor 560. The filter 550 is disposed between the fourth lens 540 and the image sensor 560. The image sensor 560 forms an image surface on which an image of a subject could be focused.

Table 9 illustrates physical properties of the lenses constituting the optical imaging system 500, and Table 10 illustrates aspherical coefficients of the lenses constituting the optical imaging system 500.

TABLE 7

| Surface No. | Remark | Radius of Curvature | Thickness or Distance | Refractive Index | Abbe Number | Focal Length |
|---|---|---|---|---|---|---|
| S1 | First Lens | 2.0967 | 0.7238 | 1.5825 | 30.00 | 33.573 |
| S2 | | 2.0633 | 0.2825 | | | |
| S3 | Second Lens | 1.4041 | 0.3778 | 1.5354 | 56.09 | 9.111 |
| S4 | | 1.7865 | 0.3969 | | | |
| S5 | Third Lens | 19.0755 | 0.7053 | 1.5354 | 56.09 | 6.243 |
| S6 | | −4.0010 | 0.1453 | | | |
| S7 | Fourth Lens | 1.2496 | 0.4315 | 1.5354 | 56.09 | 8.783 |
| S8 | | 1.4968 | 0.5404 | | | |
| S9 | Filter | infinity | 0.3051 | 1.5084 | 64.17 | |
| S10 | | infinity | 0.7207 | | | |
| S11 | Imaging Plane | infinity | 0.0203 | | | |

TABLE 8

| Surface No. | S1 | S2 | S3 | S4 | S5 | S6 | S7 | S8 |
|---|---|---|---|---|---|---|---|---|
| K | −0.63110 | −7.37100 | −1.95300 | 0.13240 | 92.09000 | −99.00000 | −0.68650 | −0.69820 |
| A | −0.03269 | −0.03513 | −0.05978 | −0.00349 | 0.14740 | −0.13870 | −0.12450 | 0.01949 |
| B | 0.04752 | 0.01375 | −0.12680 | −0.18340 | −0.16240 | 0.04687 | −0.00301 | −0.11130 |
| C | −0.05507 | 0.01136 | 0.10450 | 0.08624 | 0.13250 | 0.11680 | −0.00373 | 0.05649 |
| D | 0.04047 | −0.01110 | −0.03937 | −0.00633 | −0.07049 | −0.14400 | 0.00200 | −0.01576 |
| E | −0.01777 | 0.00216 | 0.00938 | −0.00906 | 0.02075 | 0.07326 | −0.00022 | 0.00252 |
| F | 0.00399 | 0.00001 | −0.00145 | 0.00347 | −0.00251 | −0.01783 | −1.2E−06 | −0.00021 |
| G | −0.00038 | 0.00000 | 0.00014 | −0.00045 | −0.00002 | 0.00169 | −5.7E−08 | 0.00001 |
| H | 0 | 0 | 0 | 0 | 0 | 0 | 0 | 0 |

TABLE 9

| Surface No. | Remark | Radius of Curvature | Thickness or Distance | Refractive Index | Abbe Number | Focal Length |
|---|---|---|---|---|---|---|
| S1 | First Lens | 2.0551 | 0.7972 | 1.5825 | 30.00 | 25.335 |
| S2 | | 2.0633 | 0.2760 | | | |
| S3 | Second Lens | 1.4325 | 0.3778 | 1.5354 | 56.09 | 9.844 |
| S4 | | 1.7861 | 0.3659 | | | |
| S5 | Third Lens | 18.3677 | 0.6934 | 1.5354 | 56.09 | 6.328 |
| S6 | | −4.1003 | 0.1453 | | | |
| S7 | Fourth Lens | 1.2888 | 0.4129 | 1.5354 | 56.09 | 8.102 |
| S8 | | 1.6286 | 0.5349 | | | |
| S9 | Filter | infinity | 0.3051 | 1.5084 | 64.17 | |
| S10 | | infinity | 0.7207 | | | |
| S11 | Imaging Plane | infinity | 0.0203 | | | |

TABLE 10

| Surface No. | S1 | S2 | S3 | S4 | S5 | S6 | S7 | S8 |
|---|---|---|---|---|---|---|---|---|
| K | −0.64240 | −5.62200 | −2.10700 | −0.10510 | 92.09000 | −99.00000 | −0.61060 | −0.46600 |
| A | −0.03129 | −0.03600 | −0.05234 | −0.00064 | 0.16820 | −0.12020 | −0.09522 | 0.04899 |
| B | 0.05392 | 0.02173 | −0.12650 | −0.18290 | −0.17900 | 0.04382 | −0.01529 | −0.12440 |
| C | −0.05860 | 0.01280 | 0.10540 | 0.08824 | 0.13550 | 0.11290 | −0.00327 | 0.05591 |
| D | 0.04136 | −0.01129 | −0.03825 | −0.00656 | −0.07045 | −0.14300 | 0.00237 | −0.01479 |
| E | −0.01738 | 0.00200 | 0.00960 | −0.00917 | 0.02075 | 0.07327 | −0.00030 | 0.00236 |
| F | 0.00384 | −0.00009 | −0.00171 | 0.00368 | −0.00251 | −0.01783 | −1.1E−06 | −0.00021 |
| G | −0.00038 | 0.00000 | 0.00014 | −0.00045 | −0.00002 | 0.00169 | −9.6E−15 | 0.00001 |
| H | 0 | 0 | 0 | 0 | 0 | 0 | 0 | 0 |

Table 11 illustrates main optical characteristic values of an optical imaging system according to the first through fifth examples, and Table 12 illustrates Conditional Expression values of an optical imaging system according to the first through fifth examples.

TABLE 11

| Optical Characteristics | First Example | Second Example | Third Example | Fourth Example | Fifth Example |
|---|---|---|---|---|---|
| EPD | 3.0135 | 3.0135 | 3.0800 | 3.1738 | 3.2163 |
| TTL | 4.650 | 4.650 | 4.650 | 4.650 | 4.650 |
| f | 2.900 | 2.940 | 2.950 | 3.020 | 3.020 |
| f1 | 129.211 | 101.544 | 90.740 | 33.573 | 25.335 |
| f2 | 7.550 | 7.565 | 7.545 | 9.111 | 9.844 |
| f3 | 4.859 | 5.065 | 5.382 | 6.243 | 6.328 |
| f4 | 13.848 | 13.618 | 12.242 | 8.783 | 8.102 |

TABLE 12

| Conditional Expression | First Example | Second Example | Third Example | Fourth Example | Fifth Example |
|---|---|---|---|---|---|
| TTL/f | 1.6014 | 1.5846 | 1.5769 | 1.5396 | 1.5371 |
| R1/TTL | 0.4770 | 0.4738 | 0.4721 | 0.4509 | 0.4420 |
| EPD/TTL | 0.6478 | 0.6475 | 0.6621 | 0.6826 | 0.6917 |
| (f1 + f2)/f | 47.0778 | 37.1498 | 33.3169 | 14.1338 | 11.6294 |
| f3/f | 1.6726 | 1.7245 | 1.8244 | 2.0672 | 2.0919 |
| f4/f | 4.7760 | 4.6367 | 4.1498 | 2.9083 | 2.6783 |
| R1/f | 0.7639 | 0.7508 | 0.7444 | 0.6943 | 0.6794 |
| R3/f | 0.5986 | 0.5700 | 0.5603 | 0.4649 | 0.4735 |
| R5/f | 28.9157 | 28.6006 | 28.4746 | 6.3164 | 6.0720 |
| F No | 0.9600 | 0.9700 | 0.9500 | 0.9500 | 0.9400 |
| Nd1 | 1.6174 | 1.6174 | 1.6174 | 1.5825 | 1.5825 |

An optical imaging system according to the examples may have the following optical characteristics in general. For example, a total length TTL of the optical imaging system may be in a range of 4.0 mm to 5.2 mm, a focal length f may in a range of 2.6 mm to 3.4 mm, and an entrance pupil diameter EPD may be in a range of 2.80 mm to 3.4 mm. A focal length f1 of a first lens may be in a range of 20 mm to 140 mm, a focal length f2 of a second lens may be in a range of 5.0 mm to 12 mm, a focal length f3 of a third lens may be in a range of 3.0 mm to 8.0 mm, and a focal length f4 of a fourth lens may be in a range of 6.0 mm to 16.0 mm.

In an optical imaging system according to the examples, a distance between a second lens and a third lens may be the largest. In addition, a distance D23 from an image-side surface of a second lens to an object-side surface of a third lens may be greater than a distance D12 from an image-side surface of a first lens to an object-side surface of a second lens and a distance D34 from an image-side surface of a third lens to an object-side surface of a fourth lens.

In an optical imaging system according to the examples, a distance between a third lens and a fourth lens may be the smallest. In addition, a distance D34 from an image-side surface of a third lens to an object-side surface of a fourth lens may be smaller than a distance D12 from an image-side surface of a first lens to an object-side surface of a second lens and a distance D23 from an image-side surface of the second lens to an object-side surface of the third lens.

In an optical imaging system according to the examples, the first lens may be the thickest lens. In addition, a thickness TD1 at the center of an optical axis of a first lens is greater than a thickness TD2 at the center of an optical axis of a second lens, a thickness TD3 at the center of an optical axis of a third lens, and a thickness TD4 at the center of an optical axis of a fourth lens.

In an optical imaging system according to the examples, a second lens or a fourth lens may be a lens thinner than a neighboring lens. In addition, the thickness TD2 at the center of an optical axis of the second lens is smaller than a thickness TD1 at the center of an optical axis of the first lens and a thickness TD3 at the center of an optical axis of the third lens. Moreover, the thickness TD4 at the center of an optical axis of the fourth lens is smaller than the thickness TD3 at the center of an optical axis of the third lens.

As set forth above, according to the examples, an optical imaging system capable of achieving miniaturization while capturing an image at low illumination may be implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
    a first lens having positive refractive power, a second lens having positive refractive power, a third lens having positive refractive power and comprising a convex object-side surface, and a fourth lens having positive refractive power, sequentially disposed from an object side to an image surface of the optical imaging system,
    wherein an F No. of the optical imaging system is equal to or less than 1.0, and
    wherein a distance along an optical axis from an image-side surface of the second lens to the object-side surface of the third lens is greater than a distance along the optical axis from an image-side surface of the first lens to an object-side surface of the second lens.

2. The optical imaging system of claim 1, wherein visible light transmission of the first lens is equal to or less than 5%.

3. The optical imaging system of claim 1, wherein the second lens comprises an inflection point on an image-side surface.

4. The optical imaging system of claim 1, wherein the third lens comprises a convex image-side surface.

5. The optical imaging system of claim 1, wherein the fourth lens comprises a concave image-side surface.

6. The optical imaging system of claim 1, wherein
    $5.0 < (f1+f2)/f < 80$,
    where f is a focal length of the optical imaging system, f1 is a focal length of the first lens, and f2 is a focal length of the second lens.

7. The optical imaging system of claim 1, wherein
    $1.0 < f3/f < 2.5$,
    where f is a focal length of the optical imaging system, and f3 is a focal length of the third lens.

8. The optical imaging system of claim 1, wherein
    $1.0 < f4/f < 6.0$,
    where f is a focal length of the optical imaging system, and f4 is a focal length of the fourth lens.

9. The optical imaging system of claim 1, wherein
    $0.3 < R1/f < 2.0$,
    where f is a focal length of the optical imaging system, and R1 is a radius of curvature of an object-side surface of the first lens.

10. The optical imaging system of claim 1, wherein
    $0.3 < R3/f < 2.0$,
    where f is a focal length of the optical imaging system, and R3 is a radius of curvature of an object-side surface of the second lens.

11. The optical imaging system of claim 1, wherein
    $5.0 < R5/f < 80$,
    where f is a focal length of the optical imaging system, and R5 is a radius of curvature of an object-side surface of the third lens.

12. The optical imaging system of claim 1, wherein
    $1.580 < Nd1 < 1.640$,
    where Nd1 is a refractive index of the first lens.

13. The optical imaging system of claim 1, wherein
    $1.0 < TTL/f < 2.0$,
    where TTL is a distance from an object-side surface of the lens closest to the object side to the image surface, and f is a focal length of the optical imaging system.

14. The optical imaging system of claim 1, wherein
    $0.3 < R1/TTL < 5.0$,
    where TTL is a distance from an object-side surface of the lens closest to the object side to the image surface, and R1 is a focal length of the lens closest to the object side.

15. The optical imaging system of claim 1, wherein
    $0.5 < EPD/TTL < 0.7$,
    where TTL is a distance from an object-side surface of the lens closest to the object side to the image surface, and EPD is a diameter of an entrance pupil.

16. An optical imaging system, comprising:
    a first lens having positive refractive power, a second lens having positive refractive power and comprising an inflection point on an image-side surface, a third lens having positive refractive power, and a fourth lens having positive refractive power, sequentially disposed from an object side to an image surface of the optical imaging system,
    wherein an F No. of the optical imaging system is equal to or less than 1.0.

* * * * *